United States Patent [19]
Minnick

[11] Patent Number: 5,426,814
[45] Date of Patent: Jun. 27, 1995

[54] HEATED WINDSHIELD WIPER WITH FLUID DISPENSING MEANS

[76] Inventor: Leonard J. Minnick, P.O. Box 28236, El Jebel, Colo. 81628

[21] Appl. No.: 188,686

[22] Filed: Jan. 31, 1994

[51] Int. Cl.6 .......................... B60S 1/38; B60S 1/46; B60S 1/52
[52] U.S. Cl. .............................. 15/250.04; 15/250.06; 15/250.41; 15/250.36; 219/202
[58] Field of Search .......... 15/250.01, 250.09, 250.36, 15/250.42, 250.41; 219/202, 203

[56] References Cited
U.S. PATENT DOCUMENTS

| | | | |
|---|---|---|---|
| 2,194,671 | 3/1940 | Pauro | 15/250.06 |
| 2,865,040 | 12/1958 | Hamm | 15/250.06 |
| 2,925,617 | 2/1960 | Williams | 15/250.04 |
| 3,936,901 | 2/1976 | Theckston | 15/250.06 |
| 4,473,919 | 10/1984 | Fritz, Jr. | 15/250.40 |
| 4,497,083 | 2/1985 | Nielsen, Jr. et al. | 15/250.06 |

FOREIGN PATENT DOCUMENTS 253617 12/1948 Switzerland ................. 15/250.06

*Primary Examiner*—Gary K. Graham

[57] ABSTRACT

A heated windshield wiper having a heating element for melting ice formations on both the wiper and an associated windshield. The wiper includes an elongated cylindrical body having a hollow interior and three wiping surfaces which project from the body and extend longitudinally along the wiper. A helical heating element is concentrically positioned within the hollow interior of the wiper and is connectable to the vehicle battery to heat the entire outer circumference of the wiper body and the wiping surfaces to melt ice surrounding the wiper and present on the windshield. Alternate embodiments of the present invention include a fluid dispensing arrangement for dispensing fluid over the heating coil and through apertures in the wiping surfaces, as well as an air expansion assembly for expanding the cylindrical body and the wiping surfaces to fracture ice formations surrounding the wiper.

4 Claims, 4 Drawing Sheets

HEATED WINDSHIELD WIPER WITH FLUID DISPENSING MEANS

BACKGROUND OF THE INVENTION

1. Field of the Invention

The present invention relates to wipers and more particularly pertains to a windshield wiper having a heating element for melting ice formations on booth the wiper and an associated windshield.

2. Description of the Prior Art

The use of wipers is known in the prior art. More specifically, wipers heretofore devised and utilized for the purpose of cleaning glass surfaces are known to consist basically of familiar, expected and obvious structural configurations, notwithstanding the myriad of designs encompassed by the crowded prior art which have been developed for the fulfillment of countless objectives and requirements.

For example, a heated wiper blade is illustrated in U.S. Pat. No. 3,718,940 which comprises a blade for window wipers having an electrical resistance element extending therethrough for heating the wiping lip. The electrical resistance element is characterized by a thin membrane comprised of flat plate sections joined by flexible coupling sections adapted to be independently bendable within the wiper blade body without distortion thereof. The membrane is provided with maximum heat transfer and reinforcing features as related to the wiper blade body for a most direct and effective heat transfer to the working surface that is to be defrosted and wiped clean.

An electrically heated wiper blade utilizing a fibrous carbon heating element is described in U.S. Pat. No. 4,928,344 which may be incorporated into existing windshield wiper assemblies. The unit comprises an elastic wiper blade, and a flexible, fibrous carbon heating element disposed in the blade substantially along its entire length thereof. The heating element contains a plurality of fibrous carbon strands coaxially surrounded by a heat shrunk polymeric tube. The heating element is substantially flexible and allows the wiper blade to conform to the curves of the subjacent windshield.

Another patent of interest is U.S. Pat. No. 3,936,901 which discloses a wiper blade with an embedded heating element. The heating arrangement includes a resistance element encased in the blade element for heating water fed into the cavity and out of holes in the blade element onto an associated windshield. The resistance element is advantageously a wire arranged in a folded non-conductive tubular member encased in the blade element. The water dispensing holes dispense the heated water on both sides of the wiping element.

Other known prior art wipers include U.S. Pat. Nos. 4,967,437, and 4,928,345.

While these devices fulfill their respective, particular objectives and requirements, the aforementioned patents do not disclose a windshield wiper having a heating element for melting ice formations which includes an elongated cylindrical body having a hollow interior and three wiping surfaces which project from the body and extend longitudinally along the wiper with a helical heating element concentrically positioned within the hollow interior of the wiper. Furthermore, none of the known prior art wipers teach or suggest a heated windshield wiper which comprises the aforementioned structure and which further comprises a fluid dispensing arrangement for dispensing fluid over the heating coil and through apertures in the wiping surface, as well as in air expansion assembly for expanding the cylindrical body and the wiping surfaces to fracture ice formations surrounding the wiper.

In these respects, the heated windshield wiper according to the present invention substantially departs from the conventional concepts and designs of the prior art, and in so doing provides an apparatus primarily developed for the purpose of cleaning an associated windshield while simultaneously melting ice formations on both the wiper and the windshield.

SUMMARY OF THE INVENTION

In view of the foregoing disadvantages inherent in the known types of wipers now present in the prior art, the present invention provides a new heated windshield wiper construction wherein the same can be utilized for cleaning an associated windshield and removing ice formations on both the wiper and the windshield. As such, the general purpose of the present invention, which will be described subsequently in greater detail, is to provide a new heated windshield wiper apparatus which has many of the advantages of the wipers mentioned heretofore and many novel features that result in a heated windshield wiper which is not anticipated, rendered obvious, suggested, or even implied by any of the prior art wipers, either alone or in any combination thereof.

To attain this, the present invention essentially comprises a heated windshield wiper having a heating element for melting ice formations on both the wiper and an associated windshield. The wiper includes an elongated cylindrical body having a hollow interior and three wiping surfaces which project from the body and extend longitudinally along the wiper. A helical heating element is concentrically positioned within the hollow interior of the wiper and is connectable to the vehicle battery to heat the entire outer circumference of the wiper body and the wiping surfaces to melt ice surrounding the wiper and present on the windshield. Alternate embodiments of the present invention include a fluid dispensing arrangement for dispensing fluid over the heating coil and through apertures in the wiping surfaces, as well as an air expansion assembly for expanding the cylindrical body and the wiping surfaces to fracture ice formations surrounding the wiper.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new heated windshield wiper apparatus which has many of the advantages of the wipers mentioned heretofore and many novel features that result in a heated windshield wiper which is not anticipated, rendered obvious, suggested, or even implied by any of the prior art wipers, either alone or in any combination thereof.

It is another object of the present invention to provide a new heated windshield wiper which may be easily and efficiently manufactured and marketed.

It is a further object of the present invention to provide a new heated windshield wiper which is of a durable and reliable construction.

An even further object of the present invention is to provide a new heated windshield wiper which is susceptible of a low cost of manufacture with regard to both materials and labor, and which accordingly is then susceptible of low prices of sale to the consuming public, thereby making such heated windshield wipers economically available to the buying public.

Still yet another object of the present invention is to provide a new heated windshield wiper which provides in the apparatuses and methods of the prior art some of the advantages thereof, while simultaneously overcoming some of the disadvantages normally associated therewith.

Still another object of the present invention is to provide a new heated windshield wiper having a heating element for removing ice formations on both the wiper and an associated windshield.

Yet another object of the present invention is to provide a new heated windshield wipes which includes an elongated cylindrical body having a hollow interior and three wiping surfaces which project from the body and extend longitudinally along the wiper with a helical heating element concentrically positioned within the hollow interior operable to heat the entire outer circumference of the wiper body and the wiping surfaces to melt ice surrounding the wiper and present on the windshield.

Even still another object of the present invention is to provide a new heated windshield wiper which further includes a fluid dispensing arrangement for dispensing fluid over the heating coil and through apertures in the wiping surfaces.

Even still yet another object of the present invention is to provide a new heated windshield Wiper which even further includes an air expansion assembly for expanding the cylindrical body and the wiping surfaces to fracture ice formation surrounding the wiper.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
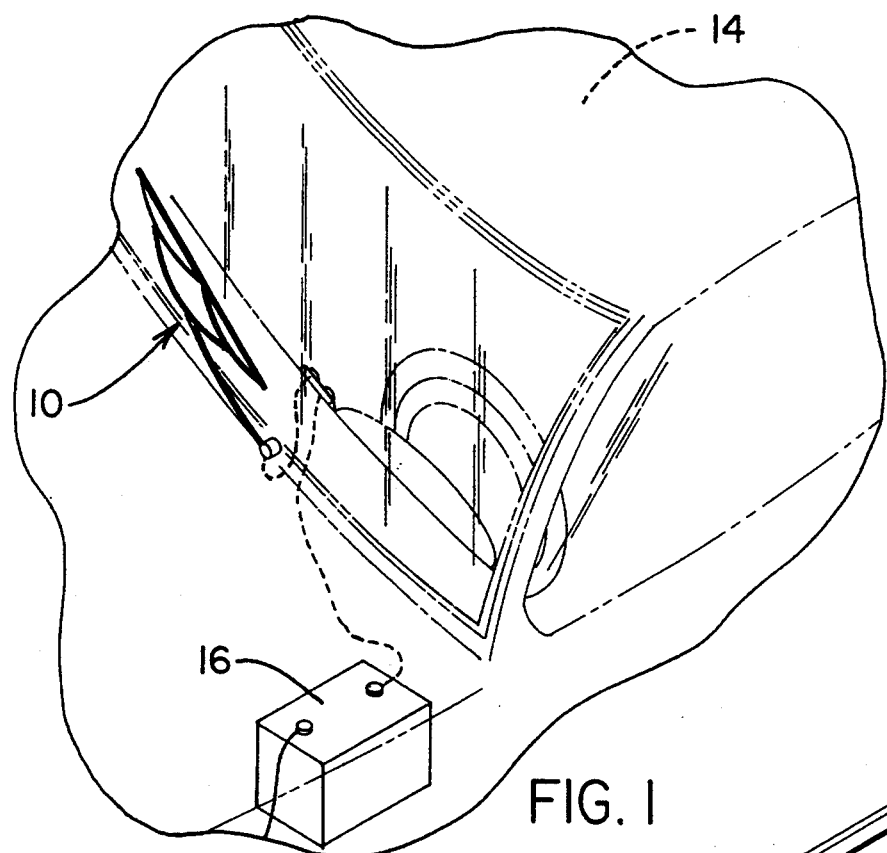
FIG. 1 is a perspective view of a first embodiment of a heated windshield wiper comprising the present invention as installed on a vehicle.

With reference now to the drawings, and in particular to FIGS. 1-4 thereof, a first embodiment of a new heated windshield wiper embodying the principles and concepts of the present invention and generally designated by the reference numeral 10 will be described.

Figure 2:
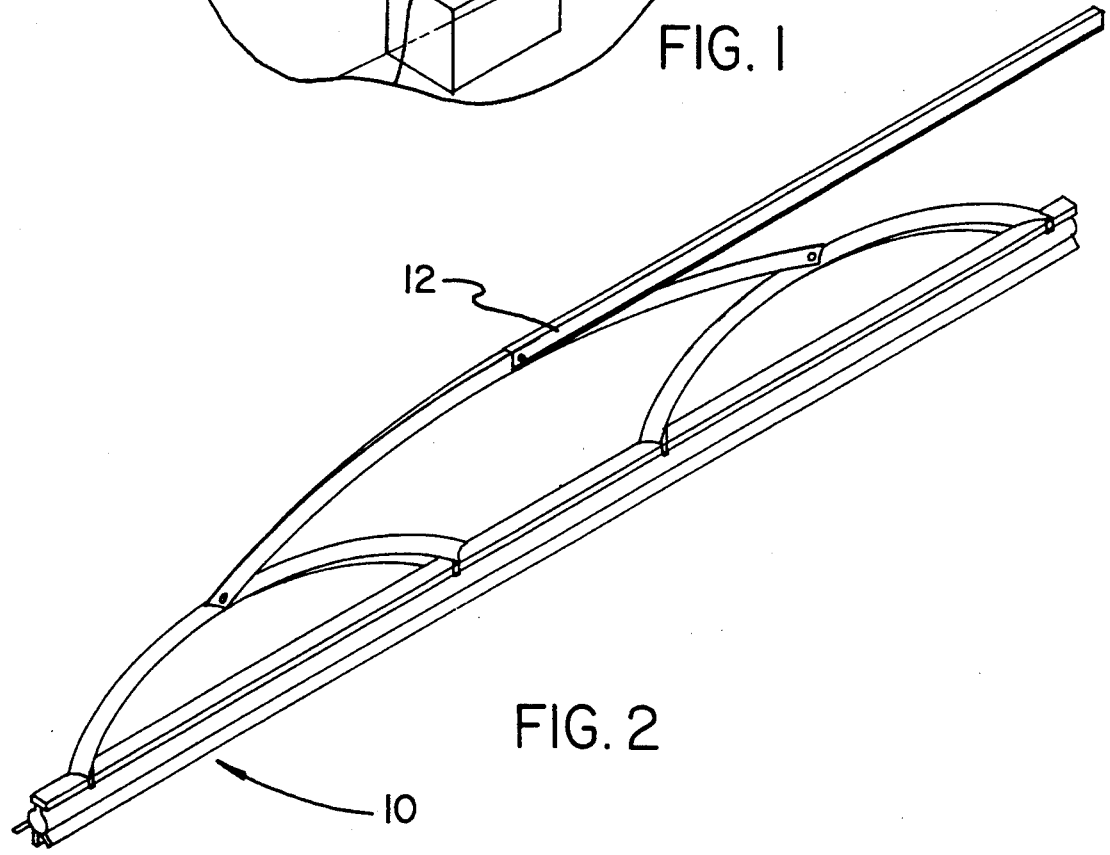
FIG. 2 is a further perspective view of the present invention.

From an overview standpoint, the heated windshield wiper 10 may be received and supported by a conventional wiper arm 12 typically found on a conventional automobile 14, as best illustrated in FIGS. 1 and 2. Such vehicle 14 typically includes a battery 16 which powers various accessories throughout the vehicle.

Figure 3:
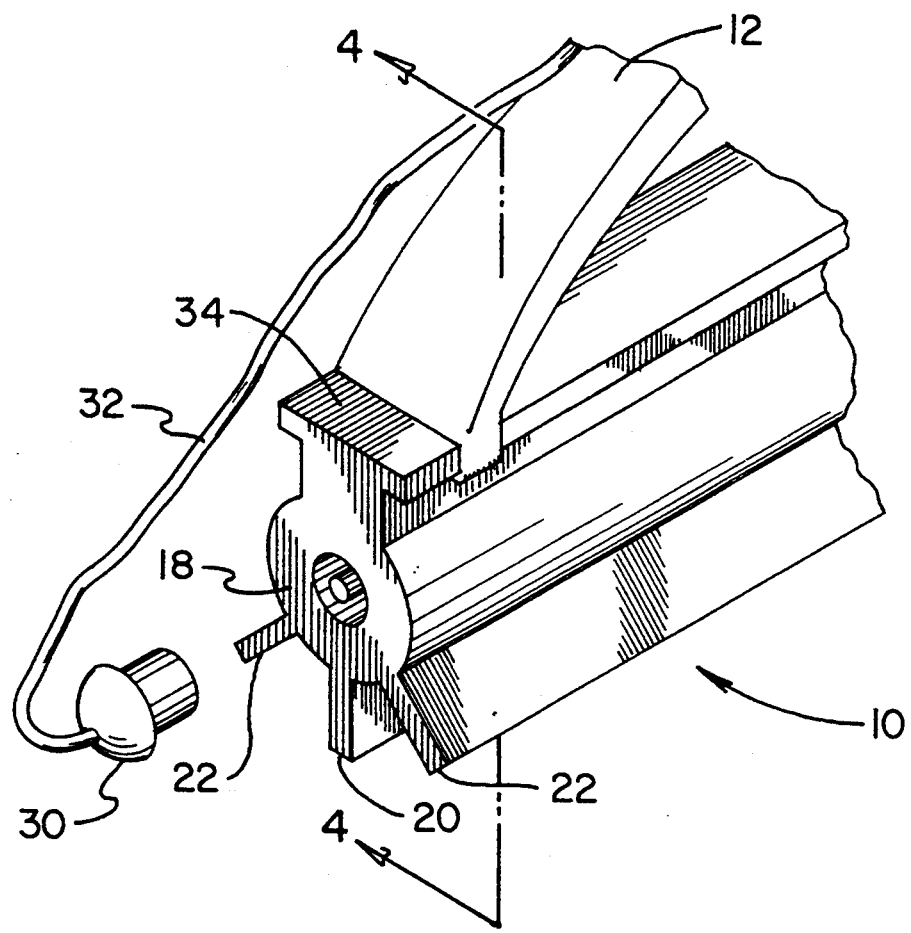
FIG. 3 is an enlarged perspective view of a portion of the first embodiment.

As best illustrated in FIG. 3, it can be shown that the heated windshield wiper blade 10 comprises an elongated cylindrical body 18 from which a plurality of wiping surfaces project. The wiping surfaces include a center wiping surface 20 or lip which is flanked by a pair of outer wiping surfaces or lips 22 positioned in a parallel relationship relative thereto. The wiping surfaces or lips 20, 22 extend substantially the entire longitudinal length of the elongated cylindrical body 18 and each terminate in a tip operable to engage and mechanically wipe an associated windshield positioned therebeneath.

The elongated cylindrical body 18 includes a hollow interior 24 within which a helical heating element 26 is concentrically disposed. A socket 28 is positioned at an unlabeled end of the cylindrical body 18 and is operable to receive a cooperatively shaped plug 30, thereby connecting the heating element 26 to a wire 32 which is ultimately connected to the vehicle battery 16. Such interconnection between the socket 28 and the plug 30 allows an easy replacement of the heated windshield wiper 10 without having to disturb the arrangement and connections of the wire 32 within the vehicle.

Longitudinally positioned along a diametrically opposed surface of the cylindrical body 18 with respect to the center wiping surface 20, is a T-shaped retainer 34 operable to be received within the conventional wiper arm 12, thereby securing the heated wiper blade 10 to the wiper arm in a conventional manner.

Figure 4:
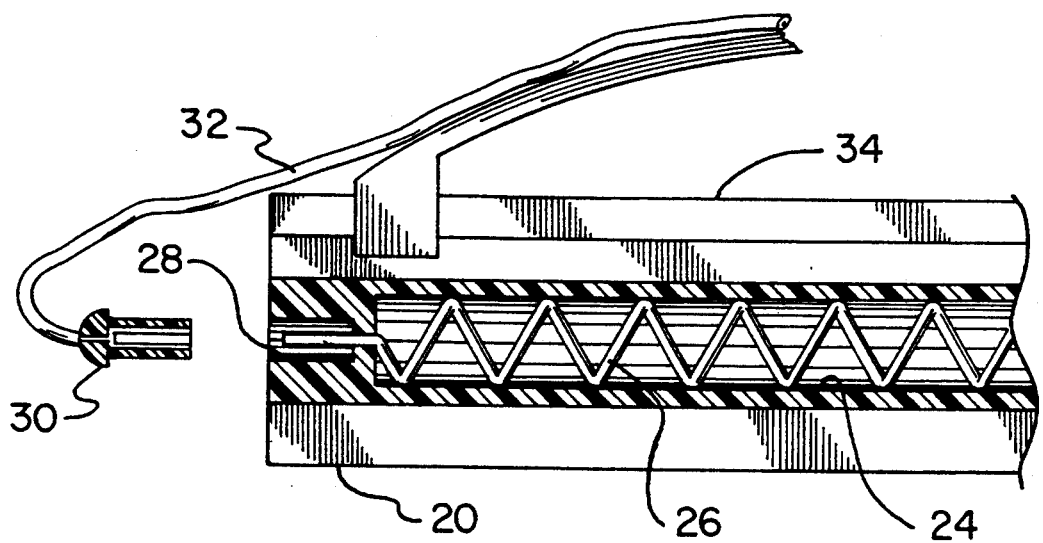
FIG. 4 is a cross-sectional view taken along line 4—4 of FIG. 3.

In use, the heated wiper blade 10 may be easily installed onto any conventional wiper arm 12 via an engagement of the T-shaped retainer 34, as shown in FIGS. 3 and 4. The wire 32 may then be electrically connected through an appropriate switching arrangement to the vehicle battery 16 whereby electrical communication between the heating element 26 and the vehicle battery 16 is finalized by an engagement of the plug 30 to the socket 28. The heating element 26 may then be selectively energized through an operation of the switching arrangement, whereby ice formations present upon either or both the wiper 10 and the associated windshield may be melted by the heat generated by the heating element 26. Because of the helical shape of the heating element 26, a greater surface area of the heating element is provided than available with prior art heated wipers and, therefore, heat is distributed to the entire outer circumference of the wiper body and the wiping surfaces to melt ice surrounding the wiper and present on the associated windshield.

More specifically, it will be noted that the heated wiper 10 comprises an elongated cylindrical body 18 formed of a substantially resilient material, such as natural rubber, synthetic rubber, and the like. The elongated cylindrical body 18 is shaped so as to define a substantially elongated tubular member having a hollow interior 24 operable to receive and enclose a helical shaped heating element 26 as best illustrated in FIG. 4. The heating element 26 extends substantially an entire longitudinal length of the interior 24 of the cylindrical body 18 as defined by the length of the hollow interior and extends exterior of the hollow interior into a socket 28. Although illustrated for only one of such sockets 28, it should be understood that the heating element 26 terminates at both ends of the cylindrical body 18 in a socket as illustrated in FIG. 4. The sockets 28 may each be cooperatively coupled to a plug 30 and a wire 32 to provide energization of the heating element 26 through an appropriate switching arrangement connected to the vehicle battery 16, as illustrated in FIG. 1. It is contemplated that the heating element 26 may be grounded through the wiper arm 12 to eliminate the need for an additional wire 32.

The cylindrical body 18 is integrally or otherwise coupled to a T-shaped retainer 34 which extends substantially an entire longitudinal length thereof and is operable to be captured within a portion of the conventional wiper arm 12, as best illustrated in FIG. 3. Such coupling between the wiper arm 12 and the retainer 34 is conventional and it is within the intent and preview of the present invention to include other retainer shapes conventionally known which may be utilized to couple the wiper 10 to the wiper arm 12.

Positioned along a diametrically opposed surface with respect to the T-shaped retainer 34 is a center wiping surface 20 which extends substantially an entire length therealong. Positioned along the respectively opposed sides of the center wiping surface 20 are a pair of outer wiping surfaces 22 which extend in a parallel relationship with respect to the center wiping surface, such that the center wiping surface 20 and one of the outer wiping surfaces 22 is in contact with the windshield at all times. More specifically, on the forward stroke of the wiper arm 12, one of the outer wiping surfaces 22 and the center wiping surface 20 will be in contact, and on the return stroke, the other outer wiping surface 22 and the center wiping surface 20 will be in contact with the windshield.

In use, the heated wiper blade 10 may be easily installed onto any conventional wiper arm 12 via an engagement of the T-shaped retainer 34, as shown in FIGS. 3 and 4. The wire 32 may then be electrically connected through an appropriate switching arrangement to the vehicle battery 16 whereby electrical communication between the heating element 26 and the vehicle battery 16 is finalized by an engagement of the plug 30 to the socket 28. The heating element 26 may then be selectively energized through an operation of the switching arrangement, whereby ice formations present upon either or both the wiper 10 and the associated windshield may be melted by the heat generated by the heating element 26. Because of the helical shape of the heating element 26, a greater surface area of the heating element is provided than available with prior art heated wipers and, therefore, heat is distributed to the entire outer circumference of the wiper body and the wiping surfaces to melt ice surrounding the wiper and present on the associated windshield.

Figure 5:
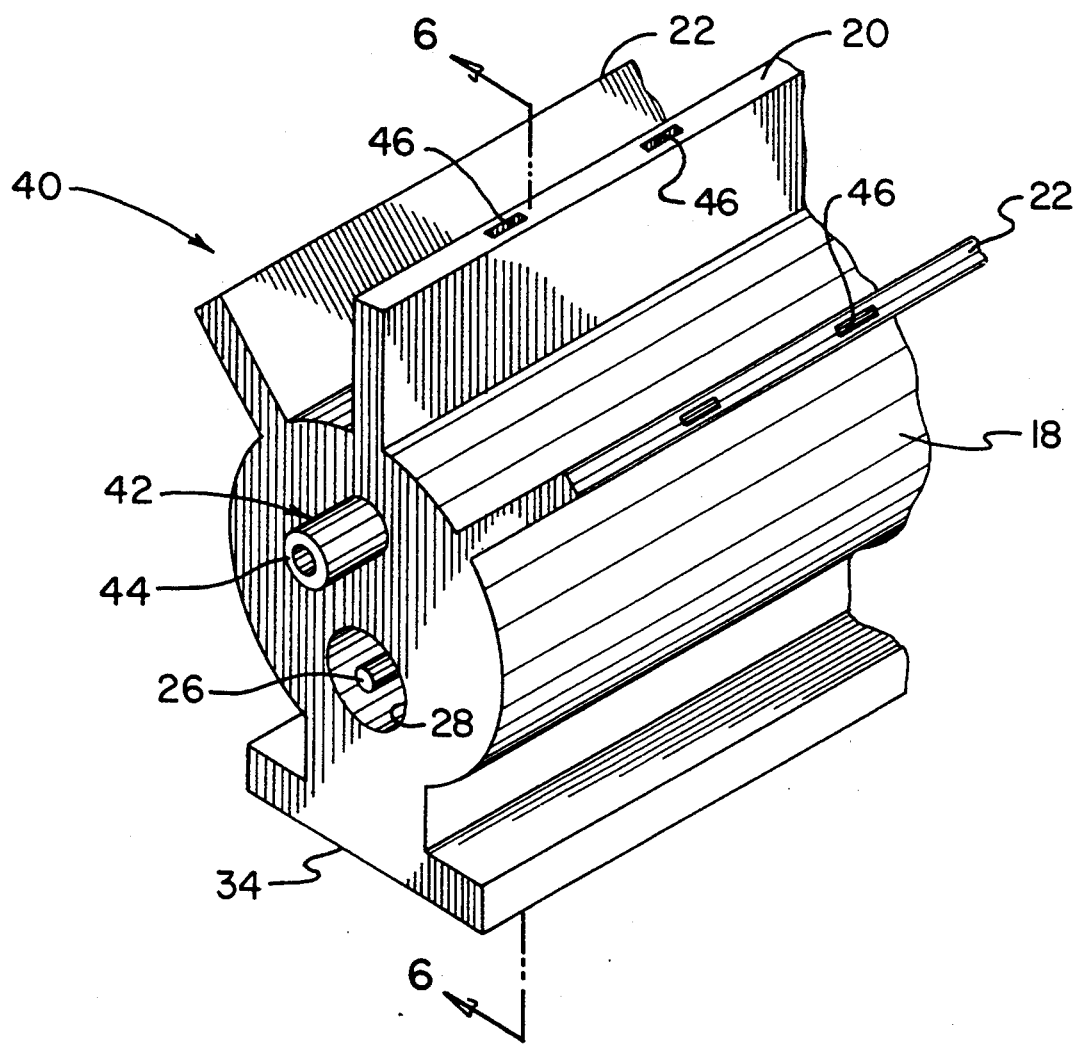
FIG. 5 is an enlarged perspective view of a portion of a second embodiment of a heated windshield wiper comprising the present invention.
Figure 6:
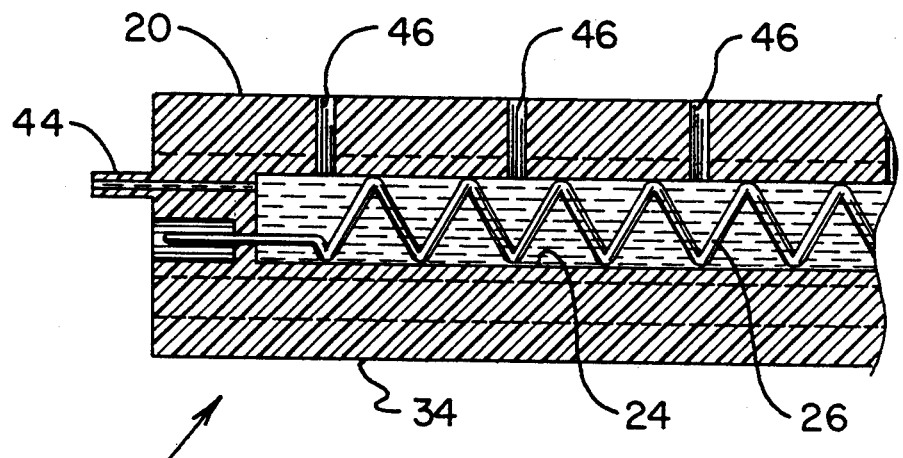
FIG. 6 is a cross-sectional view taken along line 6—6 of FIG. 5.

A second embodiment of the present invention, as generally designated by the reference numeral 40, which comprises substantially all of the features and structure of the foregoing embodiment 10 and which further comprises a fluid dispensing arrangement 42 will now be described. As best shown in FIGS. 5–6, it can be shown that the fluid dispensing arrangement 42 comprises a fluid fitting 44 which extends from an end of the cylindrical body 18 and is operable to be connected to an unillustrated fluid supply to allow fluid to be injected into the hollow interior 24 of the body, whereby it is heated by the heating element 26.

In the second embodiment 40, the wiping surfaces 20, 22 are each provided with a plurality of outlet apertures 46 which extend therethrough to provide communication between the hollow interior 24 of the body 18 and the outermost edge or tip of each wiping surface. This arrangement allows a cleaning fluid, such as windshield fluid, to be heated by the heating element 26 and subsequently dispensed through the outlet apertures at the tip of each wiping surface 20, 22 onto the subjacent windshield. By this direct application of the fluid through the outlet apertures 46 onto the windshield, the fluid is not exposed to the ambient air prior to its dispensing thereon. This allows the full heat content of the fluid to be transferred directly to the windshield without the significant heat loss which would occur if the fluid contacted the surrounding ambient air prior to its deposit on the windshield.

Figure 7:
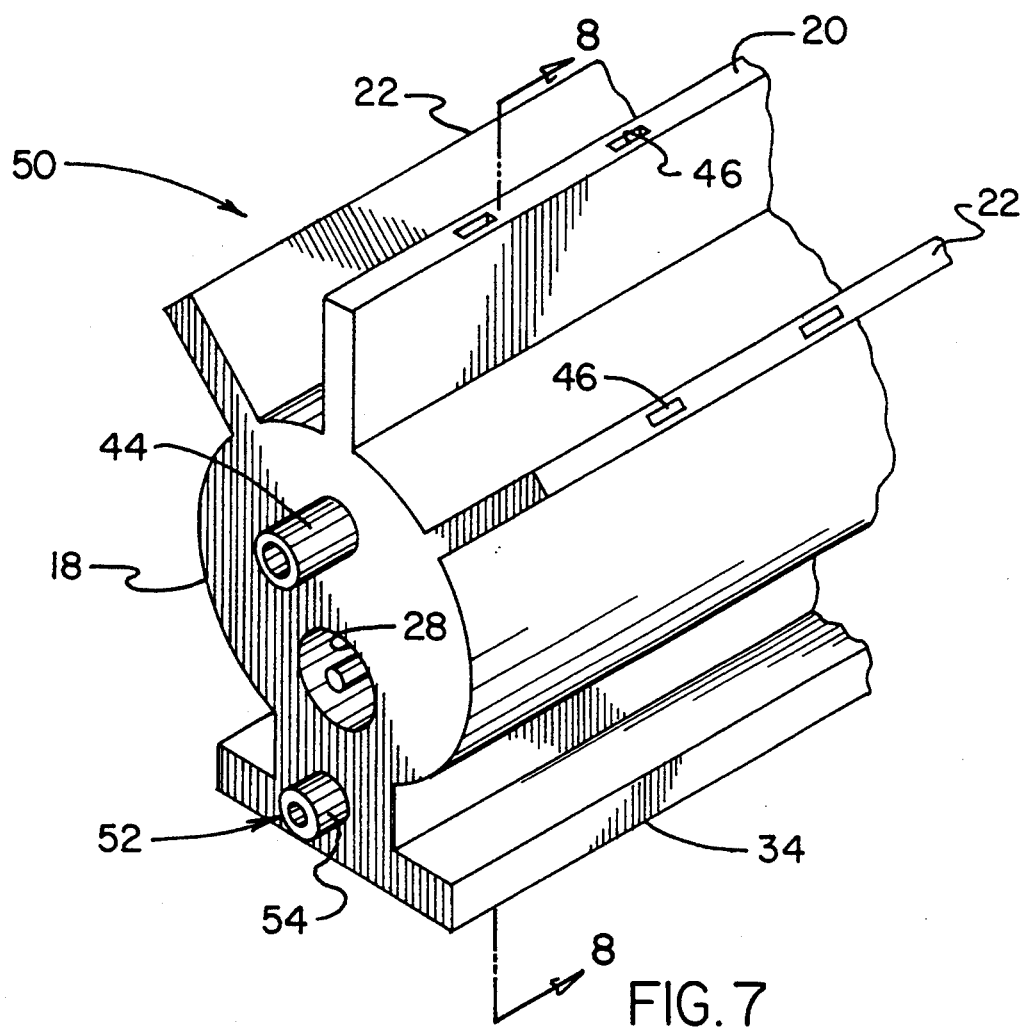
FIG. 7 is an enlarged perspective view of a portion of a third embodiment of a heated windshield wiper comprising the present invention.
Figure 8:
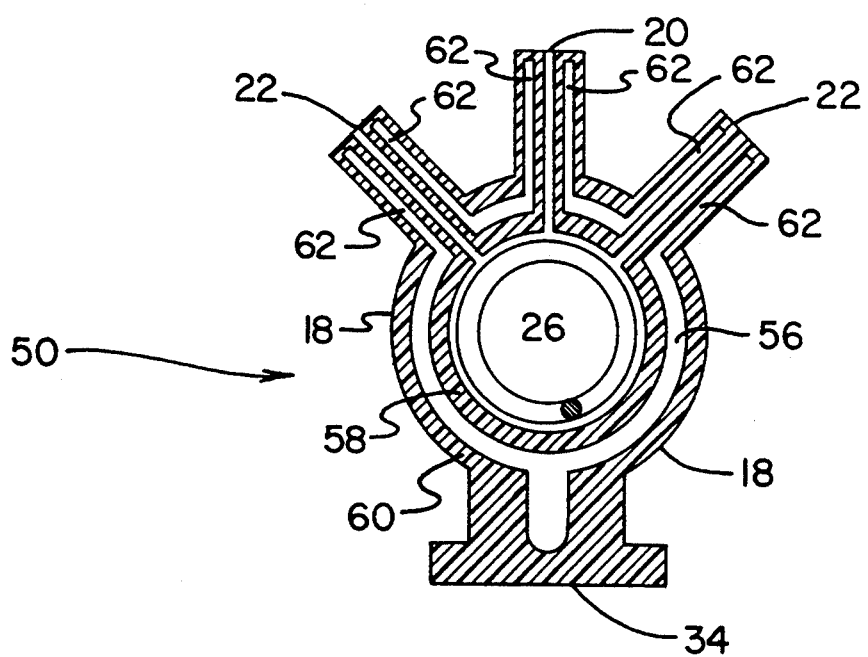
FIG. 8 is a cross-sectional view taken along line 8—8 of FIG. 7.

Comprising substantially all of the features and structure of the previous embodiments 10, 40 is a third embodiment which is generally designated by the reference numeral 50 and may be viewed in FIGS. 7–8. With reference to these Figures and concurrent reference to Figures previously discussed, it can be shown that the third embodiment 50 further comprises an air expansion assembly 52 operable to significantly expand the cylindrical body 18, as well as the wiping surfaces 20, 22 to fracture any ice formations present therearound.

The air expansion assembly 52 comprises an air fitting 54 which allows air to be injected into an air passage 56 which is concentrically positioned between an interior wall 58 and an exterior wall 60 which form an integral part of the cylindrical body 18 and the wiping surfaces 20, 22. The portions of the air passage 56 located between the center wiping surface 20 and the outer wiping surfaces 22 are in fluid communication with the rest of the air passage along the longitudinal length of the cylindrical body 18, except where the outlet apertures 46 extend into the hollow interior 24, as shown in the illustration of FIG. 8. Such arrangement allows the outlet apertures 46 to communicate with the hollow interior 24 and maintain a sealed relationship with respect to the air passage 56. Additionally, the outlet apertures 46 are each flanked by air branches 62 which fluidly communicate with the air passage 56.

The air expansion assembly 52 may be connected to a pressurized air source through suitable tubing which engages the air fitting 54 and allows pressurized air to be injected into the air passage 56. The injection of pressurized air into the air passage 56 will cause a resilient expansion of the exterior walls 60 of the cylindrical body 18, thereby fracturing ice formations present therearound. Additionally, pressurized air will also flow into the air branches 62 forming an integral part of each of the wiping surfaces 20, 22, thereby causing a similar expansion of these surfaces and subsequent fracturing of any ice formations present thereon. The air branches 62 are further operable to reduce a cross-sectional area of the outlet apertures 46, whereby fluid being dispensed therethrough will have a higher velocity and therefore, a greater cleaning effect. Thus, an injection of both fluid and air as described above into the heated windshield wiper 50 will fracture ice formations formed therearound, and create a high pressure spray out each of the outlet apertures 46.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heated windshield wiper comprising:

an elongated body having an outer circumference, a longitudinal length, a pair of ends, and defining a hollow interior therein, said body further having a pair of sockets with one of said sockets at one of said ends and another of said sockets at another of said ends;

means for coupling said elongated body to a wiper arm;

a center wiping lip having sides, said wiping lip extending substantially all of said longitudinal length of said elongated body and projecting substantially orthogonally therefrom;

a pair of outer wiping lips extending substantially all of said longitudinal length of said elongated body and projecting substantially orthogonally therefrom, one of said outer wiping lips being positioned proximate one of said sides of said center wiping lip and another of said outer wiping lips being positioned proximate another of said sides of said center wiping lip; and, a helical heating element extending through said hollow interior, said helical heating element being in direct contact with an interior surface of said elongated body, said helical heating element further having an interior volume extending through coils of said element, said interior volume of said heating element being substantially hollow, said heating element extending into said sockets and being connectable to a power source to heat substantially all of said outer circumference of said elongated body and said wiping lips, wherein each of said wiping lips includes a tip with a plurality of outlet apertures extending from said tip and into said hollow interior, and further comprising a fluid dispensing means for dispensing a fluid into said hollow interior, whereby said fluid is heated by said heating element and dispensed through plurality of outlet apertures of said wiping lips at said tips thereof.

2. The new heated windshield wiper of claim 1, wherein said fluid dispensing means comprises a fluid fitting connectable to a fluid supply, said fluid fitting being in fluid communication with said hollow interior.

3. The new heated windshield wiper of claim 2, and further comprising an air expansion means for expanding said body and said wiping lips to fracture ice surrounding said wiper.

4. The new heated windshield wiper of claim 3, wherein said body is shaped so as to define an air passage extending internally and concentrically with respect to said hollow interior, and each of said wiping lips is shaped so as to define a pair of air branches in fluid communication with said air passage, and further wherein said air expansion means comprises an air fitting extending through said body in fluid communication with said air passage and connectable to a pressurized air source, whereby an injection of pressurized air into said air passage and said air branches will expand both said body and said wiping lips to fracture ice present thereon.

* * * * *